W. G. SAVAGE.
Corn Planter.

No. 30,158. Patented Sept. 25, 1860.

Witnesses:
J. W. Coombs
R. L. Spencer

Inventor:
W. G. Savage
by Munn & Co.
Attys.

UNITED STATES PATENT OFFICE.

W. G. SAVAGE, OF CLINTON, ILLINOIS.

IMPROVEMENT IN CORN-PLANTERS.

Specification forming part of Letters Patent No. 30,158, dated September 25, 1860.

*To all whom it may concern:*

Be it known that I, W. G. SAVAGE, of Clinton, in the county of De Witt and State of Illinois, have invented a new and Improved Corn-Planter; and I do hereby declare that the following is a full, clear, and exact description of the same, reference being had to the annexed drawings, making a part of this specification, in which—

Figure 1:
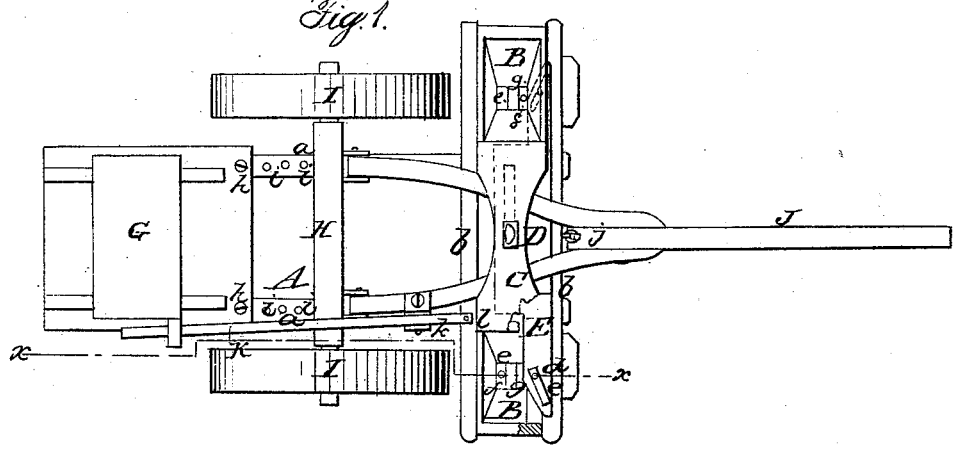
Figure 2:
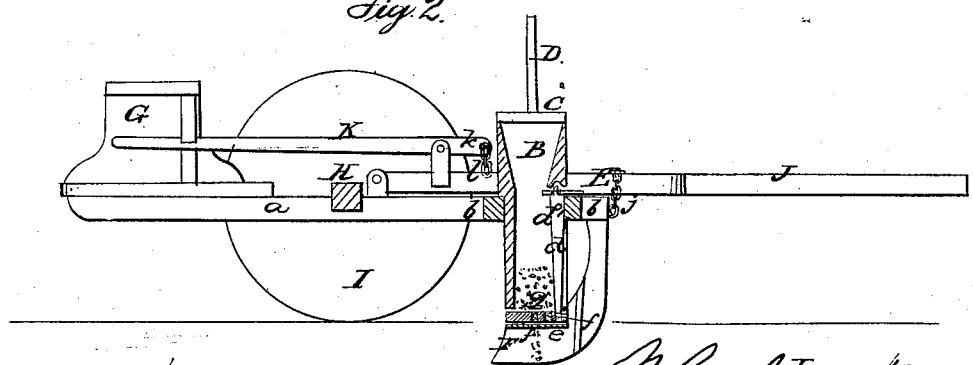

Figure 1 is a plan or top view of my invention; Fig. 2, a side sectional view of the same, taken in the line $x\ x$, Fig. 1.

Similar letters of reference indicate corresponding parts in the two figures.

To enable those skilled in the art to fully understand and construct my invention, I will proceed to describe it.

A represents the frame of the machine, which may be formed of two parallel bars, $a\ a$, connected at their front ends to traverse-bars $b\ b$, which extend some distance each side of the bars $a\ a$, and have seed-boxes B B on them, one near each end.

Between the seed-boxes B B the dropper's seat C is placed, through the center of which a lever, D, passes, the lower end of said lever being attached to a slide, E, which works on the front part of the frame, between the traverse-bars $b\ b$ and into grooves in the front part of the boxes B B. The ends of the slide E are slotted obliquely, as shown at $c$, and into their oblique slots the upper ends of levers $d$ are fitted, said levers having their fulcra at $d'$, and being placed in the front parts of the boxes B, and extending below the bars $b\ b$, down to the lower parts of the seed-boxes B, to which the furrow openers or shares F are directly attached. The furrow openers or shares F are formed of two plates spread apart at their back ends to allow the seed to drop between them, and united at their front ends and extended upward in curved form, and are attached to the front bar, $b$.

In the lower end of each seed-box B there is placed a slide, $e$, having two holes, $f\ f$, as shown in Fig. 2. The front ends of these slides are connected to the lower ends of the lever $d$. In the bottom of each seed-box a cut-off brush, $g$, is placed.

The operation of the seed-distributing device will be readily seen. The dropper sits on the seat C and moves the lever D back and forth, thereby giving a reciprocating movement to the slide E, which in turn vibrates the levers $d$, owing to the connection of the latter to the former, and a reciprocating movement is given the slides $e$ at the bottom of the boxes B, the slides distributing the seed in close proximity to the ground, owing to the depth of the seed-boxes. By this simple arrangement, therefore, the seed is distributed quite near the ground without the aid of an auxiliary seed-slide or a double seed-distributing arrangement, which renders machines of this class quite complicated, expensive, and liable to get out of repair.

On the back part of the bars $a\ a$ the driver's seat G is placed, and secured farther forward or back thereon by means of bolts or screws $h$, which may pass through either of a series of holes, $i$, in the bars $a\ a$. (See Fig. 1.) The axle H of the wheels I I is attached to about the center of the bars $a\ a$, and the draft-pole J is attached by joints $a^\times$ to the axle H. The front part of the frame A is connected to the draft-pole by a chain, $j$.

To the back part of the draft-pole a lever, K, is attached by a fulcrum-pin, $k$, and the front end of the lever K is connected by a chain, $l$, with the front part of the frame A, as shown in Fig. 2.

As regards the other part of the invention, it will be seen that the machine may be counterpoised on its axle H, whatever disparity of weight there may be between the driver and dropper on their respective seats, for by properly adjusting the driver's seat G on the bars $a$ the difference may be compensated for, and as the draft-pole J is attached directly to the axle H the machine is not incumbered by its weight, or affected in the least by it. The frame A, therefore, by actuating lever K, may be readily tilted, or its front end raised and the furrow openers or shares F readily elevated, when desired, above the surface of the ground. The depth of the furrows may be regulated by adjusting the chain $j$, which connects the front part of the frame A with the draft-pole J.

Having thus described my invention, what I claim as new, and desire to secure by Letters Patent, is—

The arrangement of the slides $e\ e$, boxes B, levers $d\ d$, slide E, adjustable seat G, seat C, axle H, pole J, and lever K, all as herein shown and described, for the purposes set forth.

W. G. SAVAGE.

Witnesses:
JOSIAH MCFARLAND,
ALLEN JONES.